(12) United States Patent
Meads et al.

(10) Patent No.: US 7,284,498 B2
(45) Date of Patent: Oct. 23, 2007

(54) DEVICES FOR IMPROVED MILKING

(76) Inventors: Roger W. Meads, W8498 Grand View Rd., Hortonville, WI (US) 54944-9769; Steve Gostisha, P.O. Box 246, Goodman, WI (US) 54125

( * ) Notice: Subject to any disclaimer, the term of this patent is extended or adjusted under 35 U.S.C. 154(b) by 34 days.

(21) Appl. No.: 11/203,748

(22) Filed: Aug. 15, 2005

(65) Prior Publication Data

US 2006/0065198 A1    Mar. 30, 2006

Related U.S. Application Data

(60) Provisional application No. 60/601,920, filed on Aug. 16, 2004.

(51) Int. Cl.
*A01J 3/00* (2006.01)
(52) U.S. Cl. .............. 119/14.02; 119/14.2; 119/14.21
(58) Field of Classification Search ............. 119/14.02, 119/14.19, 14.2, 14.21; 604/43
See application file for complete search history.

(56) References Cited

U.S. PATENT DOCUMENTS

| | | | |
|---|---|---|---|
| 1,116,379 A | | 11/1914 | Browning |
| 1,992,807 A | | 2/1935 | Benson |
| 1,995,051 A | * | 3/1935 | Benson ................. 119/14.21 |
| 3,294,063 A | * | 12/1966 | Brodrick ................... 426/2 |
| 3,653,359 A | | 4/1972 | Tolle et al. |
| 3,703,898 A | | 11/1972 | Zackheim |
| 3,881,448 A | * | 5/1975 | Hallstrom ................ 119/14.19 |
| 4,202,329 A | | 5/1980 | Kortum |
| 4,236,520 A | * | 12/1980 | Anderson ................... 604/264 |
| 4,281,658 A | | 8/1981 | Child |
| 4,301,796 A | | 11/1981 | Child |
| 4,308,859 A | | 1/1982 | Child |
| 4,346,714 A | | 8/1982 | Child |
| 4,359,044 A | | 11/1982 | Child |
| 4,365,632 A | | 12/1982 | Kortum |
| 4,385,633 A | | 5/1983 | Child |
| 4,418,686 A | | 12/1983 | Child |
| 4,453,930 A | | 6/1984 | Child |
| 6,369,694 B1 | | 4/2002 | Mejia |
| 6,559,620 B2 | | 5/2003 | Zhou et al. |
| 6,720,930 B2 | | 4/2004 | Johnson et al. |
| 6,847,892 B2 | | 1/2005 | Zhou et al. |
| 6,947,004 B2 | | 9/2005 | Mejia et al. |
| 7,015,826 B1 | | 3/2006 | Chan et al. |

FOREIGN PATENT DOCUMENTS

EP    0 044 804 A1 *  1/1982

OTHER PUBLICATIONS

Hirsbrunner et al., "Implantation of a reinforced polytetrafluoroethylene vascular graft for treatment of obstructions of the teat and mammary gland cisternae in cattle," J Am Vet Med Assoc. May 1, 1998;212 (9):1432-5.
Reinemann et al., Milking Machine Research: Past, Present and Future, Univ. of Wisconsin Milking Research and Instruction Lab, Madison, WI paper presented at the 42nd Annual Meeting of the National Mastitis Council, Ft. Worth, TX, USA, Jan. 26-29, 2003, 4 pages.

* cited by examiner

*Primary Examiner*—Rob Swiatek
(74) *Attorney, Agent, or Firm*—Casimir Jones, S.C.

(57) ABSTRACT

A milking system for animals. In particular, the present invention relates to a milking system implantable within the teat of an animal which provides improved milking rapidity and decreased mastitis incidence.

17 Claims, 4 Drawing Sheets

DEVICES FOR IMPROVED MILKING

This application claims priority to U.S. Provisional Application Ser. No. 60/601,920, filed Aug. 16, 2004, herein incorporated by reference in its entirety.

FIELD OF THE INVENTION

The present invention relates to a milking system for animals. In particular, the present invention relates to a milking system implantable within the teat of an animal that provides improved milking rapidity and decreased mastitis incidence.

BACKGROUND OF THE INVENTION

Damage to the teats of dairy cows through the use of milking machines causes substantial economic loss to the dairy industry. These losses occur from physical teat damage, increased incidence of mastitis, and increased culling rates.

Typical milking machines comprise a teat cup that includes a hollow, rigid outer shell or sleeve having a port that is adapted to be attached to a pulsating vacuum line. A resilient, tubular liner or inflation typically extends from a top to a bottom of the sleeve, concentrically disposed within the shell. The ends of the inflation make sealing engagement with the shell to form an annular vacuum chamber between the shell and the inflation. The pressure in the annular chamber is alternated between a lower pressure, typically a sub-atmospheric pressure, and a higher pressure, typically atmospheric, by the pulsating vacuum line attached to the shell at the port. A milk-collecting vacuum line is connected to a milk-receiving cup attached to the shell and in communication with the interior of the inflation, positioned at the lower end of the inflation. This line is to draw milk from the cow's teat and convey it to a collection tank. The valve distal opening of the milking system is received through an upper end of the inflation. The interior of the inflation is maintained at a sub-atmospheric pressure, and the alternating pressure in the annular chamber periodically forces the walls of the inflation outwardly and inwardly resulting in a massaging action on the teat as well as periodically collapsing the walls of the inflation below the teat. The collapse of the inflation periodically relieves the teat from exposure to the vacuum within the inflation due to the negative pressure in the milk-collecting vacuum line. The teat cup is made heavy enough that it draws the teat downward, and the combination of the effects of the weight of the teat cup and the variation of geometry of the inflation and variation of the amount of vacuum to which the teat is exposed, causes the inflation to ride up and down on the teat by a small amount. Such systems exert damaging physical and vacuum pressure on the teat and cause the teat to be immersed in milk that can contain bacteria washed off of the surface of the teat and udder.

As cows are genetically selected to produce more milk, standard machine milking time is increased. Each time a cow is milked, severe mechanical forces of vacuum and physical pressure are exerted on the teat and its structures. These adverse forces can cause skin damage to the teat, teat end erosions, and hyperkeratosis.

Irritations of the teat and teat canal ultimately increase the cow's risk of mastitis infections and decrease her lifetime productivity within the herd. During the standard milking process, the teat end of the cow is continually bathed in milk. Microorganisms on the teat of the cow are washed into the milk stream and can be injected into the teat canal via the repeated inflation/deflation cycles of the automatic milking machine. These microorganisms can cause mastitis. Clinical mastitis cases can cost as much as $300.00 per episode and subclinical mastitis greatly reduces milk production within a herd.

Additionally, increased culling rates of dairy cattle due to mastitis infections can cripple the financial performance of a dairy farm. Culling rates can easily exceed the capacity of the herd to sustain itself thus forcing the dairyman to purchase additional animals to maintain the herd at a desired number of animals.

Accordingly, what is needed is a milking system that results in less damage to the cow's teat and that reduces exposure of the mammary gland to infective agents. It would also be desirable to decrease the time required for milking.

SUMMARY OF THE INVENTION

The present invention relates to a milking system for animals. In particular, the present invention relates to a milking system implantable within the interior and exterior teat of an animal that provides improved milking rapidity and decreased mastitis incidence.

Accordingly, in some embodiments, the present invention provides a teat insert system for use in a teat of an animal comprising: a) a teat insert tube comprising proximal and distal ends, the proximal end comprising a retention member that retains the teat insert in the teat of an animal and the distal end comprising a valve attachment member; and b) a valve attachable to the valve attachment member, the valve is movable between an open position where milk can be extracted from the animal and a closed position that seals off the teat of the animal. The present invention is not limited to any particular type of retention member. In some embodiments, the retention member comprises at least one flange that extends outwardly from the proximal end of the teat insert tube. In further embodiments, the at least one flange is retractable and extends to anchor the teat insert tube in the teat. In still further embodiments, the retention member comprises a plurality of flanges. The present invention is not limited to the use of any particular type of valve. Indeed, the use of a variety of different valves is contemplated, including, but not limited to, a ball valve, a spring valve, and a poppet valve. In some embodiments, the spring valve comprises a spring, a valve head, and spring retention member, wherein spring biases the valve head against the spring retention member. In other embodiments, the poppet valve comprises a spring, a valve head, and spring retention member, wherein spring biases the valve head against the spring retention member. The present invention is not limited to any particular valve attachment member. In some embodiments, the valve attachment member comprises threads, while in other embodiments, the valve attachment member comprises at least one radial flange. In still further embodiments, the teat insert system comprises a washer that is placed at the interface of the teat insert tube and the teat of the animal. In still further embodiments, the valve further comprises a teat cup attachment member. The present invention is not limited to any particular type of teat cup attachment member. In some embodiments, the teat cup attachment member is threaded, while in other embodiments the teat cup attachment member comprises at least one radial flange configured to accept a collar lock.

In other embodiments, the present invention provides milking systems for milking an animal comprising: a) a teat insert tube comprising proximal and distal ends, the proximal end comprising a retention member that retains the teat insert in a teat of the animal and the distal end comprising a valve attachment member; b) a valve attachable to the valve attachment member, the valve movable between an open position where milk can be extracted from the animal and a closed position that seals off the teat of the animal; c) a teat cup removably attachable to the valve; d) a vacuum pump; e) a milk line in fluid communication with the teat cup and the vacuum pump; and f) a milk tank in fluid communication with the vacuum pump. In further embodiments, the present invention further provides a cluster. In further embodiments, the cluster comprises a claw. The present invention is not limited to any particular type retention member. In some embodiments, the retention member comprises at least one flange that extends outwardly from the proximal end of the teat insert tube. In further embodiments, the at least one flange is retractable and extends to anchor the teat insert tube in the teat. In still further embodiments, the retention member comprises a plurality of flanges. The present invention is not limited to the use of any particular type of valve. Indeed, the use of a variety of different valves is contemplated, including, but not limited to, a ball valve, a spring valve, and a poppet valve. In some embodiments, the spring valve comprises a spring, a valve head, and spring retention member, wherein spring biases the valve head against the spring retention member. In other embodiments, the poppet valve comprises a spring, a valve head, and spring retention member, wherein spring biases the valve head against the spring retention member. The present invention is not limited to any particular valve attachment member. In some embodiments, the valve attachment member comprises threads, while in other embodiments, the valve attachment member comprises at least one radial flange. In still further embodiments, the teat insert system comprises a washer that is placed at the interface of the teat insert tube and the teat of the animal. In still further embodiments, the valve further comprises a teat cup attachment member. The present invention is not limited to any particular type of teat cup attachment member. In some embodiments, the teat cup attachment member is threaded, while in other embodiments the teat cup attachment member comprises at least one radial flange configured to accept a collar lock. In some preferred embodiments, the vacuum pump creates a constant vacuum. In still other embodiments, the system further comprises a disinfecting system so that the valve can be cleaned and disinfected.

In other embodiments, the present invention provides a teat insert system for use in a teat of an animal comprising: a) a teat insert tube comprising proximal and distal ends, the proximal end comprising a retention member that retains the teat insert in the teat of an animal and the distal end comprising a valve attachment member; and b) a plug attachable to the valve attachment member so that the plug seals off the teat of the animal.

In still other embodiments, the present invention provides a teat insert for use in inserting into the teat canal and teat cistern of an animal comprising a tube having proximal and distal ends, the tube having an outer diameter that allows placement of the tube in the teat canal of the animal and a length between the proximal and distal ends so that the proximal end of the tube is locatable in the teat cistern and the distal end is locatable on the exterior of the teat, the proximal end of the tube comprising at least one retention member so that the proximal end of the tube can be anchored in the teat cistern, and the distal end of the tube comprising a valve attachment member that can open and be attached to the tube.

In further embodiments, the present invention provides methods of milking an animal comprising: a) providing an animal having a teat, the teat having inserted therein a teat insert system comprising a valve; b) opening the valve to release milk from the animal.

In still further embodiments, the present invention provides methods of milking an animal having a teat comprising: a) providing a milking system comprising a vacuum pump, milk line, a teat cup, and an animal having a teat, the teat having inserted therein a teat insert system comprising a valve; b) attaching the teat cup to the teat; c) opening the valve; and d) applying a constant vacuum to the teat cup through the milk line so that milk is removed from the animal. In further embodiments, the present invention further provides a cluster. In further embodiments, the cluster comprises a claw. In some embodiments, the vacuum pump is in fluid communication with a milk tank, and the methods further comprise the step of collecting the milk in the milk tank.

DETAILED DESCRIPTION

The present invention relates to a milking system for animals. The illustrated and preferred embodiments discuss these structures and techniques in the context of external milking machines used with cows. These structures, systems, and techniques are well suited for use with any type of dairy animal (e.g., cows, goats, sheep, horses, etc). The systems and methods of the present invention have numerous advantages over previous prior art methods of animal milking including, but not limited to, increasing the rapidity of milking, decreasing mastitis incidence, lengthening the number of lactations, reducing somatic cell counts, and increasing overall milk production. FIGS. 1-7 show various preferred embodiments of the milking systems and methods of the present invention. The present invention is not limited to these particular embodiments. For convenience, the description of the invention is presented in the following sections: I) teat insert system; II) milking system; and III) uses of the milking system.

I. Teat Insert System

Figure 1:
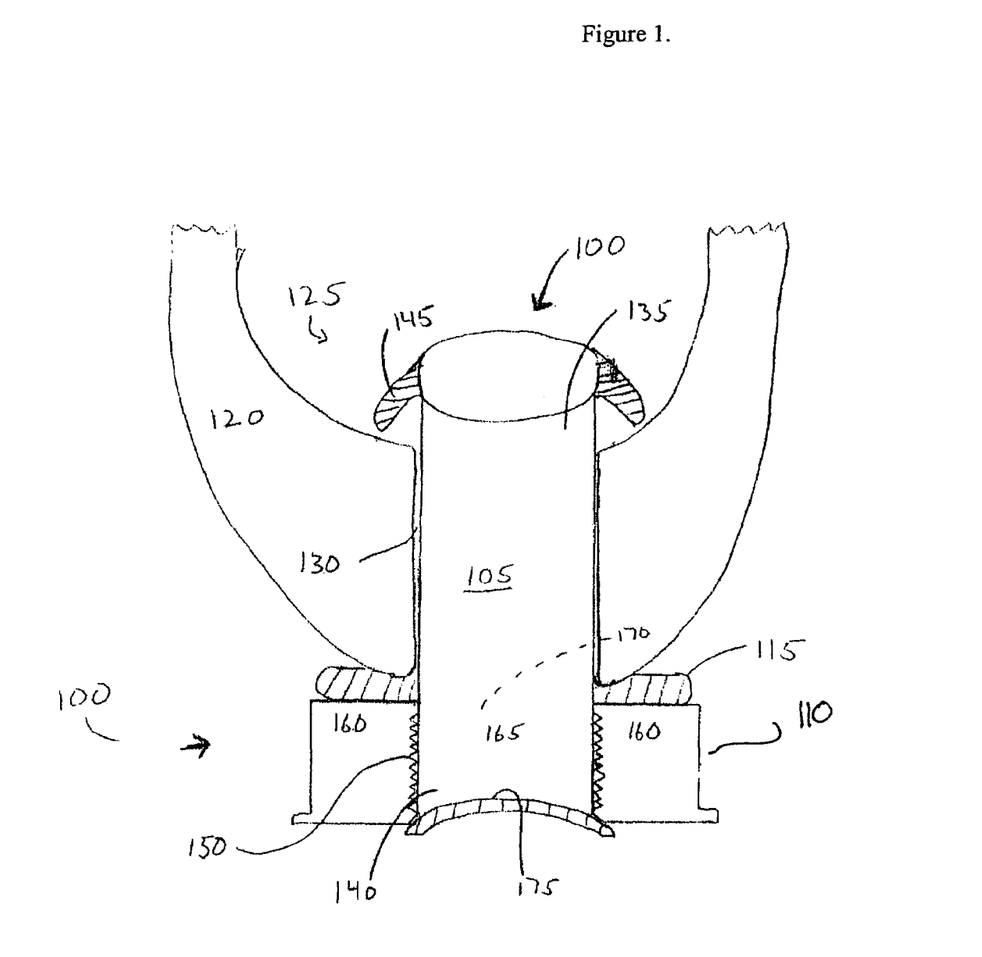
FIG. 1 provides a depiction of the teat insert system of the present invention inserted into a cow's teat.

FIG. 1 presents a schematic depiction of a teat insert system 100 of the present invention. Generally, the teat insert system 100 is used to gather milk from an animal (e.g., livestock, human, cat, dog, goat, sheep, or any mammal). In preferred embodiments, the teat insert system 100 is used with cows. The teat insert system 100 generally comprises a teat insert 105, a valve 110, and a washer 115.

Referring to FIG. 1, the teat insert system 100 interfaces with an animal's teat 120. The teat 120 comprises a teat cistern 125 and a streak canal 130. Generally, the teat cistern 125 is an open cavity and is used to store the animal's milk. The streak canal 130 functions as the orifice of the gland between the teat cistern 130 and the external environment. The streak canal 130 is closed between milkings to impede leakage. The streak canal 130 is the main barrier against infection. The Furstenberg's rosette (not shown) is a structure consisting of several folds of mucous membranes, each having several secondary folds. The Furstenberg's rosette aids in the retention of milk within the teat and prevents bacterial entrance into the teat cistern. The terminus of the streak canal 130 is regulated with streak canal sphincter muscle (not shown).

Still referring to FIG. 1, the teat insert 105 is insertable into the animal's streak canal 130 to access the teat cistern. In preferred embodiments, the teat insert 105 is permanently implanted within the teat 120. The present invention is not limited to a particular method of implanting the tube 105 within the teat 120. In preferred embodiments, the teat insert 105 is implanted within the teat 120 through laser surgery.

The teat insert 105 has a teat insert proximal end 135 and a teat insert distal end 140. In preferred embodiments, the teat insert proximal end 135 is positioned within the teat cistern 125 and the teat insert distal end 140 is positioned outside the teat 120. In some embodiments, the teat insert proximal end 135 has at least one teat insert retention member 145. The at least one teat insert retention member 145 serves to anchor the teat insert 105 in the teat 120 of the animal. In some embodiments, where the teat insert 105 comprises one teat insert retention member, the retention member can preferably be in the form of a flange (not shown) that extends radially from the teat insert proximal end 135. In preferred embodiments, the teat insert 105 comprises a plurality of teat insert retention members 145 that extend outwardly from the teat insert proximal end 135. The teat insert retention members 145 are preferably positionable at the interface of the streak canal 130 and the teat cistern 125. The teat insert retention members 145 anchor the tube 105 within the teat 120 (discussed in more detail below).

The teat insert distal end 140 preferably comprises a valve attachment member 150. In some embodiments, the valve attachment member 150 comprises threads that allow the releasable attachment of the valve 110. In other embodiments, the valve attachment region comprises a flange or series of flanges for use in conjunction with a collar lock mechanism. In preferred embodiments, the valve 110 controls the output of milk from the teat 120 and provides an interface with a teat cup (not shown) in fluid communication with a milking machine (discussed in more detail below) via milk line.

In some embodiments, a washer 115 is positioned at the interface of the teat insert 105 and bottom of the teat 120. The washer 115 preferably creates a tight seal between the bottom of the teat 120, the teat insert 105 and the valve 110 to prevent the entry of dirt, manure, and/or infectious organisms into the teat 120. The washer 115 is not limited to a particular composition (e.g., silicone, nylon, plastic, rubber, leather, etc.). In preferred embodiments, the composition of the washer 115 is formed from one of the biocompatible polymers described below. The washer 115 is not limited to particular size or shape dimensions. In preferred embodiments, the washer 115 has an opening therein which is of similar size to the outer diameter of the teat insert. The teat insert system 100 is not limited to a particular method of attaching the washer 115 onto the milking tube 105. In some embodiments, the washer 115 is secured onto the teat 120 with an adhesive agent (e.g., glue). In other preferred embodiments, the washer 115 is secured onto the teat insert 105 via a series of locking flanges so that the washer is pressed against the teat 120.

Figure 2:
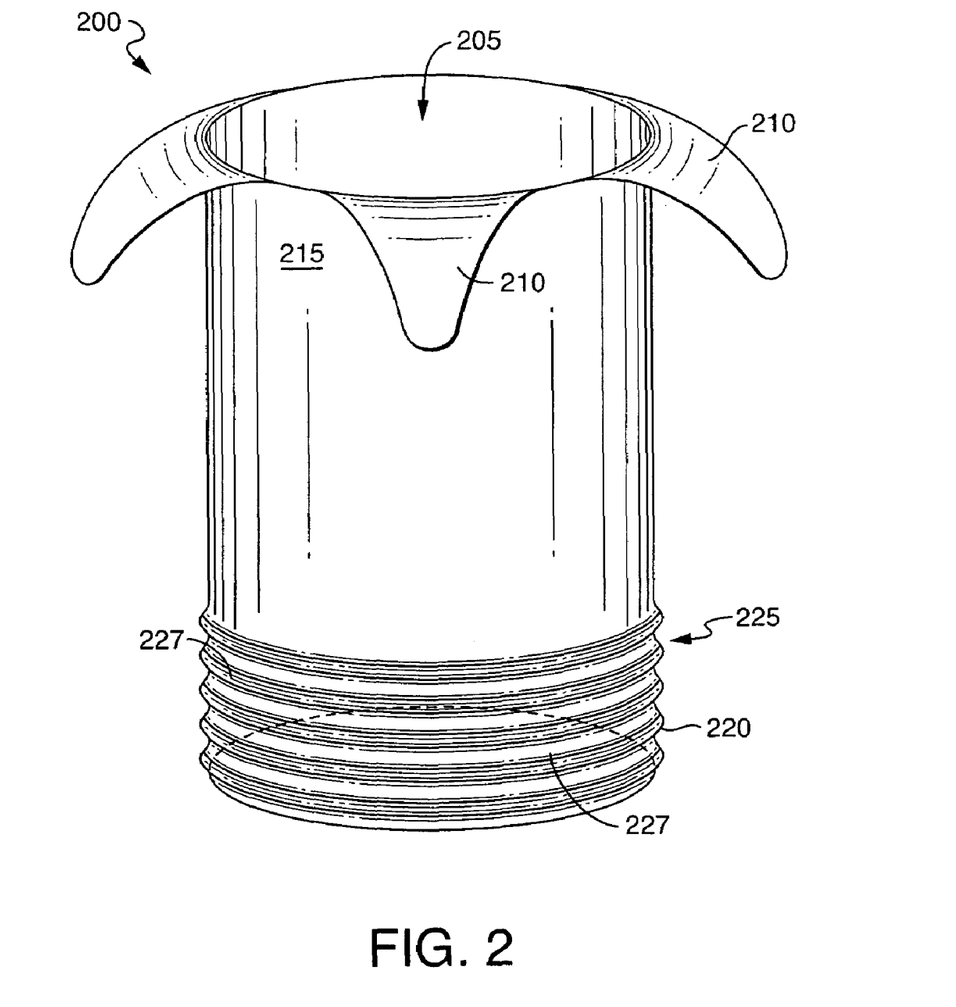
FIG. 2 provides a perspective view of a teat insert of the present invention.

FIG. 2 illustrates a preferred embodiment of a teat insert 200 for use with the present invention. The teat insert 200 is preferably configured for the flow of liquid therethrough and accordingly has an internal bore 205 therethough. The teat insert 200 is not limited to a particular composition (e.g., silicone, nylon, plastic, rubber, etc.). In some embodiments, the teat insert 200 is formed from stainless steel, tantalum, titanium, nitinol, gold, platinum, inconel, iridium, silver, tungsten, or another biocompatible metal, or alloys of any of these; carbon or carbon fiber; cellulose acetate, cellulose nitrate, silicone, polyolefins such as metallocene catalyzed polyethylenes, polypropylenes, and polybutylenes and copolymers thereof; ethylenic polymers such as polystyrene; ethylenic copolymers such as ethylene vinyl acetate (EVA), butadiene-styrene copolymers and copolymers of ethylene with acrylic acid or methacrylic acid; polyacetals; chloropolymers such as polyvinylchloride (PVC); fluoropolymers such as polytetrafluoroethylene (PTFE); polyesters such as polyethylene terephthalate (PET); polyester-ethers; polysulfones; polyamides such as nylon 6 and nylon 6,6; polyamide ethers such as polyether block amides; polyethers; elastomers such as elastomeric polyurethanes and polyurethane copolymers; silicones; polycarbonates; polychloroprene; nitrile rubber; butyl rubber; polysulfide rubber; cis-1,4-polyisoprene; ethylene propylene terpolymers; as well as mixtures and block or random copolymers of any of the foregoing are non-limiting examples of biostable polymers useful for manufacturing the tubes of the present invention. Furthermore, the teat insert 200 may be formed from one material, such as metal as described above, and coated with another materials, such as one of the polymers described above.

Still referring to FIG. 2, the teat insert 200 is not limited to particular size dimensions. The present invention is not limited to any particular mechanism. Indeed, an understanding of the mechanism of is not necessary to practice the present invention. However, it is contemplated that the rate of milk flow through the milking system is dependent upon the diameter of the internal bore 205. In some embodiments, the diameter of the internal bore 205 ranges from about 1 to about 10 mm. In preferred embodiments, the diameter of the internal bore 205 is 5 mm. In some preferred embodiments, the diameter of the internal bore 205 is 2 mm. In other preferred embodiments, the diameter of the internal bore 110 is 7 mm.

Still referring to FIG. 2, the teat insert 200 preferably comprises at least one retention member 210 located at the teat insert 200 proximal end 215. The retention members 210 anchor the teat insert 200 within the teat. In preferred embodiments, the retention members 210 extend radially outward. In some embodiments, the retention members 210 extend at a downward angle towards the tube distal end. In other embodiments (not shown), the retention members 210 extend perpendicularly or at an upward angle from the tube proximal end. In still further preferred embodiments (not shown), the retention members 210 are retractable or compressable onto or into the tube to ease insertion into the streak canal.

Still referring to FIG. 2, the teat insert distal end 220 comprises a valve attachment member 225. In preferred embodiments, the valve attachment member 225 comprises threads 227. In such preferred embodiments, the teat insert 200 receives the valve by screwing the valve onto the teat insert 200. In other preferred embodiments (not shown), the valve attachment member 225 comprises one or more radial flanges that accepting the valve (e.g., using a collar lock mechanism). In further preferred embodiments, the valve attaches to the teat insert distal end 220 with an adhesive agent (e.g., glue).

Referring again to FIG. 1, the milking system 100 permits the collection of milk from an animal's teat 140 through the teat insert 105, and the regulation of such milk flow with the valve 110. In some embodiments, the valve 110 provides the interface between the teat insert system 100 and a milk line in fluid communication with an external milking machine (discussed in more detail below). The valve 110 comprises a valve sleeve 160 having an internal bore 165 therethrough, a valve proximal opening 170, and a valve distal opening 175. Preferably, the internal diameter of the teat insert 105 and the valve 110 are approximately the same. The valve proximal opening 170 interfaces with the teat insert distal end 140. The valve distal opening 175 interfaces with the external milking machine (discussed in more detail below) via a teat cup and milk line. In some embodiments, attachment of the valve 110 with the teat insert 105 creates a vacuum tight seal.

The valve 110 is not limited to a particular composition (e.g., silicone, nylon, plastic, rubber, etc.). In some embodiments, the valve 110 is formed from stainless steel, tantalum, titanium, nitinol, gold, platinum, inconel, iridium, silver, tungsten, or another biocompatible metal, or alloys of any of these; carbon or carbon fiber; cellulose acetate, cellulose nitrate, silicone, polyolefins such as metallocene catalyzed polyethylenes, polypropylenes, and polybutylenes and copolymers thereof; ethylenic polymers such as polystyrene; ethylenic copolymers such as ethylene vinyl acetate (EVA), butadienestyren copolymers and copolymers of ethylene with acrylic acid or methacrylic acid; polyacetals; chloropolymers such as polyvinylchloride (PVC); fluoropolymers such as polytetrafluoroethylene (PTFE); polyesters such as polyethylene terephthalate (PET); polyester-ethers; polysulfones; polyamides such as nylon 6 and nylon 6,6; polyamide ethers such as polyether block amides; polyethers; elastomers such as elastomeric polyurethanes and polyurethane copolymers; silicones; polycarbonates; polychloroprene; nitrile rubber; butyl rubber; polysulfide rubber; cis-1,4-polyisoprene; ethylene propylene terpolymers; as well as mixtures and block or random copolymers of any of the foregoing are non-limiting examples of biostable polymers useful for manufacturing the tubes of the present invention. Furthermore, the valve 110 may be formed from one material, such as metal as described above, and coated with another materials, such as one of the polymers described above.

The teat insert system of the present invention is not limited to any particular type of valve. Additionally, the milking system is not limited to a particular method of regulating milk flow through the valve. In preferred embodiments, the milking system uses a poppet valve to regulate milk flow. The milking system is not limited to a particular poppet valve technology. In other embodiments, the valve is preferably a ball type valve. In preferred embodiments, the valve 110 and its components are formed from stainless steel, tantalum, titanium, nitinol, gold, platinum, inconel, iridium, silver, tungsten, or another biocompatible metal, or alloys of any of these or from the biocompatible polymers described above.

Figure 3:
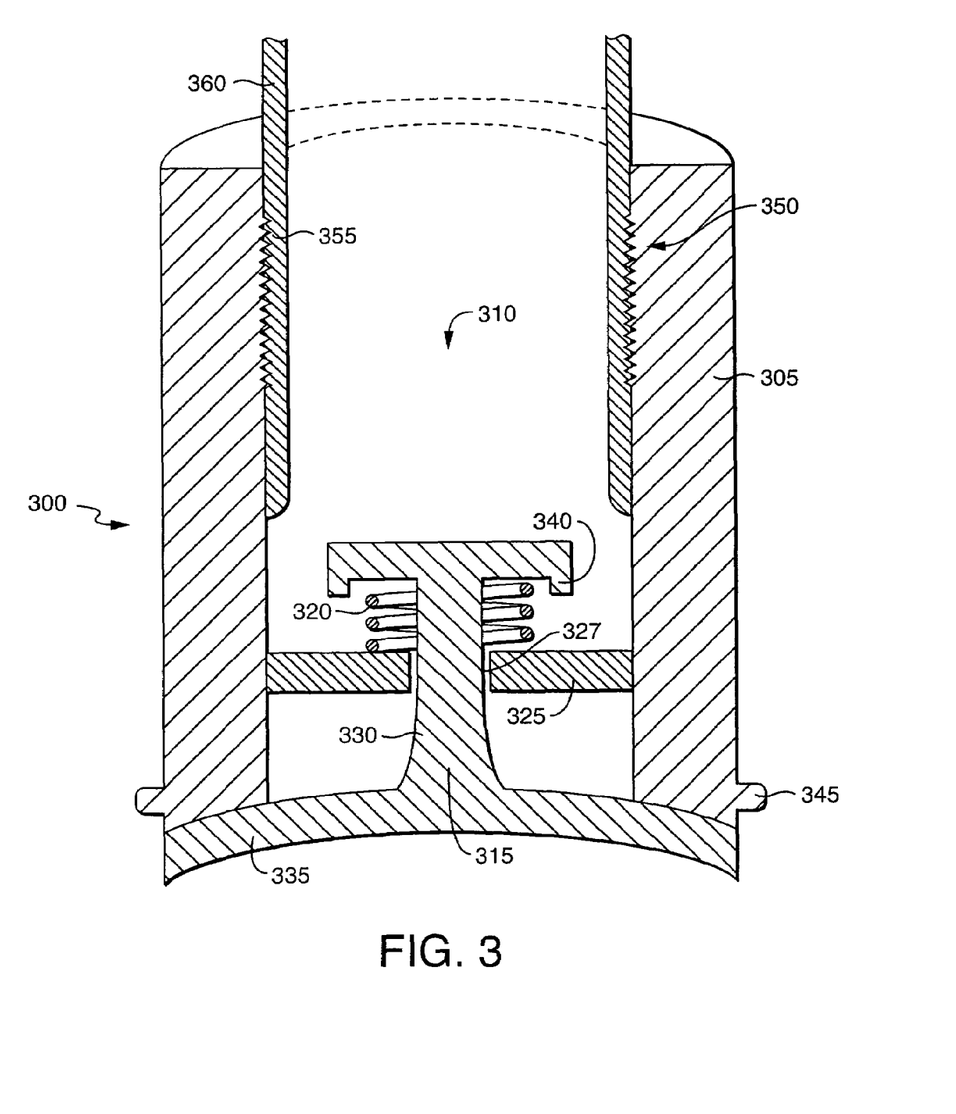
FIG. 3 provides a cross section of a poppet valve of the present invention.

FIG. 3 illustrates a spring loaded poppet valve 300 for regulating milk flow. The poppet valve 300 comprises a valve sleeve 305 having an internal bore 310 there through. In some embodiments, the poppet valve 300 further comprises a poppet 315 and a spring 320 biased against a valve cross member 325. In some embodiments, the poppet 315 comprises a poppet shaft 330, poppet head 335, and poppet spring retainer 340. The poppet 315 is supported within the valve 300 by valve cross member 325. In preferred embodiments, the valve cross member 325 has an opening therein 327 in which the poppet shaft 330 is slidably mounted.

In operation, the spring 320 exerts an upward force against the poppet spring retainer 340 so that the poppet head 335 is sealed against the valve sleeve 305. To open the poppet valve to allow milk to flow from the mammary gland of an animal, the spring 320 is compressed so the poppet shaft 330 slides through the valve cross member 325 and the poppet head 335 disengages from the valve sleeve 305. In some embodiments, the poppet head or valve sleeve comprises a teat cup attachment member. In some preferred embodiments, the milking line attachment member is a flange 345 on the valve sleeve 305 that is receivable by a locking collar on a teat cup that is fluidically connected to a milking machine via a milk line. The valve 300 further comprises a valve attachment member 350, preferably comprising a series of threads 355 that allow attachment to a teat insert 360.

Figure 4:
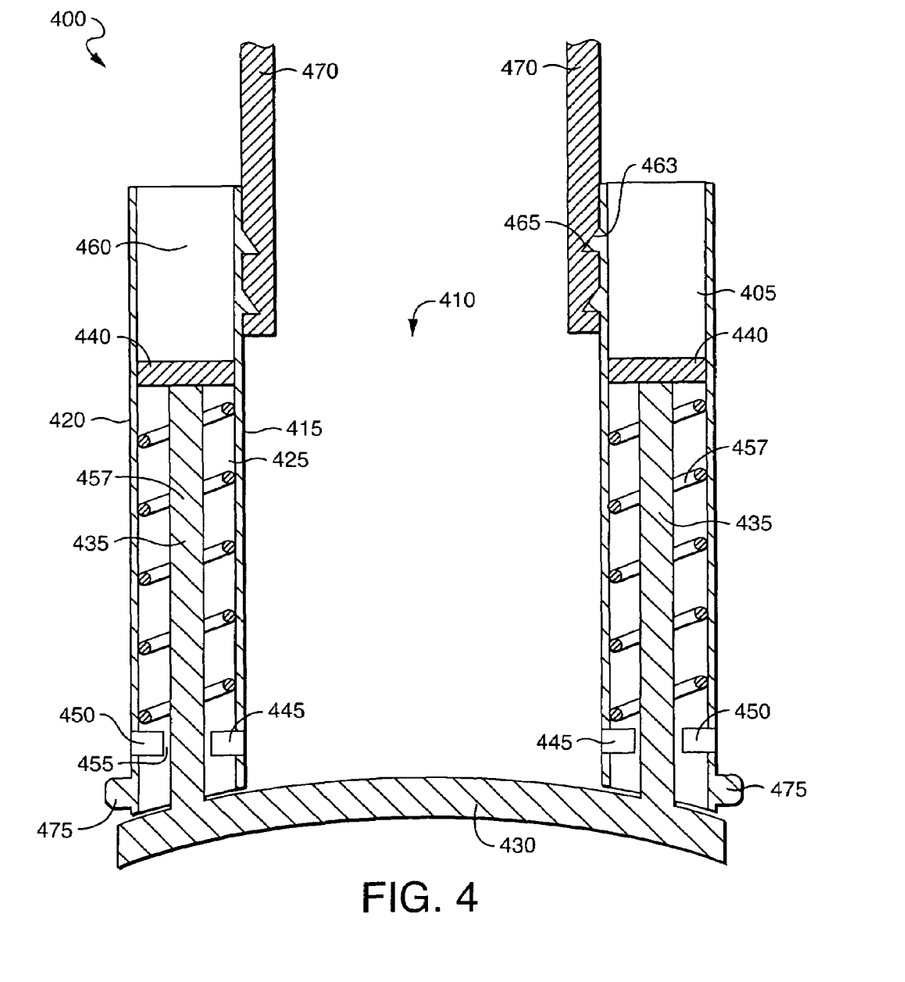
FIG. 4 provides a cross section of a spring valve of the present invention.

FIG. 4 illustrates another spring valve 400 that finds use with the present invention. In some embodiments, the spring valve 400 comprises a valve sleeve 405 having an internal bore 410 therethrough. The valve sleeve 405 further comprises inner and outer walls 415 and 420. The inner and outer walls 415 and 420 create a chamber 425 within the valve sleeve 405. The spring valve 400 further comprises a valve head 430 that interfaces with the valve sleeve 405 to seal the valve and prevent liquid such as milk from flowing therethrough. In some embodiments, a radial member 435 extends upwardly from the outer periphery of the valve head into the chamber 425. The radial member 435 terminates in an upper spring retention member 440. The spring valve 400 further comprises a lower spring retention members 445 and 450. The lower spring retention members 445 and 450 extend from the inner and outer walls 415 and 420, respectively to form the opening 455. The radial member 435 extends through the opening 455. In some embodiments, a spring 457 is biased against lower spring retention members 445 and 450 so that an upward force is exerted against the upper spring retention member 440, thereby causing the valve head 430 to seal against the valve sleeve 405.

In some embodiments, the spring valve 400 further comprises a teat insert attachment member 460. In some embodiments, the teat insert attachment member comprises at least one radial flange 463 that engages radial depressions 465 on the teat insert 470. In further preferred embodiments, the spring valve further comprises a radial flange 475 on the outer periphery of the valve sleeve that accepts a collar lock on a milking line in fluid communication with a milking machine.

In operation, the spring valve 400 is opened by exerting a force against the valve head 430. When such a force is exerted, the radial member 435 slides downwardly through the opening 445 and the upper spring retention member 440 compresses the spring 457 against the lower spring retention members 445 and 450. In some embodiments, a vacuum supplies the force to compress the spring 457 and open the spring valve 400, while in other embodiments, a magnet located in a teat cup supplies the force. When the forced is released (i.e., by disengaging the teat cup), the force exerted by the spring 457 against upper spring retention member 440 cause the valve head 430 to seal against the valve sleeve 405.

The teat insert system of the present invention further provides a dry period plug (not shown) for use when the animal is not lactating. The dry period plug replaces the valve and attaches to the teat insert via the valve attachment member 145, which preferably is a series of radial flanges or threads. In preferred embodiments, the dry period plug prevents exposure of the teat to infective agents.

II. External Milking Machine

The present invention further provides an external milking machine that interacts with the milking system. In preferred embodiments, the external milking machine collects milk passing through the milking system. The present invention is not limited to a particular external milking machine. In preferred embodiments, the external milking machine comprises a teat cup assembly in fluidic communication with at least one central milk tank.

A teat cup of the present invention includes a hollow, rigid outer shell or sleeve. The sleeve preferably comprises a valve attachment member that interfaces with the sleeve attachment member on the valve of the teat insert system to preferably form a vacuum tight seal. In some embodiments, the valve attachment member is a locking collar similar to those used on hydraulic lines. Such locking collars include a sliding collar that slides to expose an annular ring that engages, for example, a flange located on the valve. The sleeve further preferably comprises a valve opening member. The present invention is not limited to a particular type of valve opening member (e.g., mechanical, electrical, magnetic, electromagnetic, pressure). In some preferred embodiments, the valve opening member is a magnet that exerts sufficient force to compress the spring of either of the valves described in FIGS. 3 and 4 against their respective spring retention members thereby opening the valves. In other embodiments, the force against the springs is provided by a vacuum applied through the vacuum milk line. In some further preferred embodiments, the teat cup further comprises a port that is adapted to be attached to milk vacuum line. In further embodiments, a cluster is provided for the simultaneous milking of more than one teat. In some embodiments, a claw is also provided. The milk vacuum line is in turn in fluid communication with a pump which applies a vacuum to the cup to extract and transport milk to a central milk tank in fluid communication with the vacuum pump and milk line. In further embodiments, the milk vacuum line is in turn in fluid communication with a pump which applies a vacuum to the cluster including the teat cup to extract and transport milk to a central milk tank in fluid communication with the vacuum pump and milk line. In preferred embodiments, a steady state vacuum is applied to the teat cup. This is in contrast to prior art milking machines, which utilize a pulsing vacuum.

III. Uses Of Milking System

The milking system of the present invention provides a system that greatly reduces physical damage to animal teats, greatly reduces the incidence of mastitis, and allows for highly efficient throughput of cows or other dairy animals through a milking parlor along. In preferred embodiments, a teat insert system as described above is surgically or non-surgically implanted into the teat of a dairy animal. The dairy animal is milked via the teat insert system by attaching a teat cup to the teat insert system. The valve is then opened, for example, due to a force exerted by a magnet, a vacuum, and/or an electro-magnetic charge, and a steady state vacuum is applied to the teat cup and thus to the teat insert system and mammary gland. Milk flows from the mammary gland, through the teat insert system (i.e., the teat insert and the valve), into the teat cup, through the milk line, and is deposited into a central milk tank. Prior to and/or after attachment of the teat cup to the valve, the valve is preferably disinfected.

This system solves several problems inherent in the use of modern pulse milking systems. Due to the use of the valve, the milking unit (i.e., through the teat cup) does not attach to the teat of the cow. The point of attachment is at the valve itself. This removes all pressures and vacuums from the animal and transfers them to the valve. Thus, physical teat damage is greatly reduced.

Furthermore, by not attaching the milking unit to the teat of the cow, the likelihood of the transfer of infective organisms into the mammary gland is greatly reduced. In preferred embodiments, the valve is sanitized prior to attachment of the teat cup to essentially eliminate bacterial exposure to the teat end. Furthermore, the constant vacuum quickly removes milk from the udder, which also limits the chance of exposure to infective agents. It is expected that with a reduction in mastitis, udder health will significantly enhanced. This means that the cow's useful life can be increased from the national average of 1.5 lactations to 3 or more lactations.

Finally, the systems and methods of the present invention greatly increase milk parlor throughput. The average milking time per cow is now in the range of 7 minutes. The system of the present invention is expected to reduce the average milking time to 3-4 minutes. Thus, parlor throughput will nearly double. This has several important ramifications. A dairyman using the present system could double his herd size without increasing parlor investment. Alternatively, a new dairy could be constructed for half the normal investment of in the milking facility.

All publications and patents mentioned in the above specification are herein incorporated by reference. Various modifications and variations of the described devices, compositions, methods, systems, and kits of the invention will be apparent to those skilled in the art without departing from the scope and spirit of the invention. Although the invention has been described in the connection with specific preferred embodiments, it should be understood that the invention as claimed should not be unduly limited to such specific embodiments. Indeed, various modifications of the described modes for carrying out the invention that are obvious to those skilled in the art are intended to be within the scope of the following claims.

The invention claimed is:

1. A teat insert system for use in a teat of an animal comprising:
   a) a teat insert tube comprising proximal and distal ends, said proximal end comprising a retention member that retains the teat insert in the teat of an animal and said distal end comprising a valve attachment member, wherein said retention member comprises at least one flange that extends outwardly from said proximal end of said teat insert tube, wherein said at least one flange is retractable and extends to anchor said teat insert tube in said teat; and
   b) a valve attachable to said valve attachment member, said valve movable between an open position where milk can be extracted from the animal and a closed position that seals off the teat of said animal.

2. The teat insert system of claim 1, wherein said retention member comprises a plurality of flanges.

3. The teat insert system of claim 1, wherein said valve is select from the group consisting of a ball valve, a spring valve, and a poppet valve.

4. The teat insert system of claim 3, wherein said spring valve comprises a spring, a valve head, and spring retention member, wherein spring biases said valve head against said spring retention member.

5. The teat insert system of claim 3, wherein said poppet valve comprises a spring, a valve head, and spring retention member, wherein spring biases said valve head against said spring retention member.

6. The teat insert system of claim 1, further comprising a washer that is placed at the interface of said teat insert tube and said teat of said animal.

7. The teat insert system of claim 1, wherein said valve further comprises a teat cup attachment member.

8. A milking system for milking an animal comprising:
   a) a teat insert tube comprising proximal and distal ends, said proximal end comprising a retention member that retains the teat insert in a teat of said animal and said distal end comprising a valve attachment member, wherein said retention member comprises at least one flange that extends outwardly from said proximal end of said teat insert tube, wherein said at least one flange is retractable and extends to anchor said teat insert tube in said teat;
   b) a valve attachable to said valve attachment member, said valve movable between an open position where milk can be extracted from the animal and a closed position that seals off the teat of said animal;
   c) a teat cup removably attachable to said valve;
   d) a vacuum pump;
   e) a milk line in fluid communication with said teat cup and said vacuum pump; and
   f) a milk tank in fluid communication with said vacuum pump.

9. The milking system of claim 8, wherein said vacuum pump creates a constant vacuum.

10. The milking system of claim 8, wherein said vacuum pump creates a pulsated vacuum.

11. The milking system of claim 8, wherein said system further comprises a disinfecting system.

12. The milking system of claim 8, further comprising a cluster.

13. A teat insert for use in inserting into the teat canal and teat cistern of an animal comprising a tube having proximal and distal ends, said tube having an outer diameter that allows placement of said tube in said teat canal of said animal and a length between said proximal and distal ends so that said proximal end of said tube is locatable in said teat cistern and said distal end is locatable on the exterior of the teat, said proximal end of said tube comprising at least one retention member so that said proximal end of said tube can be anchored in said teat cistern, wherein said retention member comprises at least one flange that extends outwardly from said proximal end of said teat insert tube, wherein said at least one flange is retractable and extends to anchor said teat insert tube in said teat, and said distal end of said tube comprising a valve attachment member so that said tube can be attached to a valve that open and closes said tube.

14. A method of milking an animal comprising:
   a) providing an animal having a teat, said teat having inserted therein a teat insert system comprising a valve and a teat insert tube, said teat insert tube comprising proximal and distal ends, said proximal end comprising a retention member that retains the teat insert in the teat of an animal and said distal end comprising a valve attachment member, wherein said retention member comprises at least one flange that extends outwardly from said proximal end of said teat insert tube, wherein said at least one flange is retractable and extends to anchor said teat insert tube in said teat, wherein said valve is attached to said valve attachment member, wherein said valve is movable between an open position where milk can be extracted from the animal and a closed position that seals off the teat of said animal;
   b) opening said valve to release milk from said animal.

15. A method of milking an animal having a teat comprising:
   a) providing a milking system comprising a vacuum pump, milk line and teat cup and an animal having a teat, said teat having inserted therein a teat insert system comprising a valve and a teat insert tube, said teat insert tube comprising proximal and distal ends, said proximal end comprising a retention member that retains the teat insert in the teat of an animal and said distal end comprising a valve attachment member, wherein said retention member comprises at least one flange that extends outwardly from said proximal end of said teat insert tube, wherein said at least one flange is retractable and extends to anchor said teat insert tube in said teat, wherein said valve is attached to said valve attachment member, wherein said valve is movable between an open position where milk can be extracted from the animal and a closed position that seals off the teat of said animal;
   b) attaching said teat cup to said teat;
   c) opening said valve;
   d) applying a constant vacuum to said teat cup through said milk line so that milk is removed from said animal.

16. The method of claim 15, wherein said vacuum pump is in fluid communication with a milk tank, and further comprising the step of collecting said milk in said milk tank.

17. The method of claim 15, wherein said milking system further provides a cluster.

* * * * *